Dec. 19, 1950 L. J. SEESE 2,534,995
VISE
Filed Sept. 13, 1947

INVENTOR.
LEE J. SEESE
BY
ATTORNEY

Patented Dec. 19, 1950

2,534,995

UNITED STATES PATENT OFFICE 2,534,995

VISE

Lee J. Seese, University Heights, Ohio

Application September 13, 1947, Serial No. 773,766

4 Claims. (Cl. 90—60)

This invention relates to work holding devices and particularly to a vise for machine tools.

The primary object of this invention is to provide a vise that may be readily secured to the slotted bed of a milling machine or the like and readily removed therefrom when the machining operation has been completed.

Another object is to provide a vise of the type stated whose capacity is only limited by the size of the machine tool bed.

A further object is to provide a vise that will hold the work rigidly down against the machine bed while it is being machined.

Another object is to provide a vise that will hold the work below its top surface so that the entire top of the work may be machined without resetting the vise.

Still another object is to provide a vise of the type stated that is economical to manufacture and simple in operation.

These and other objects of the invention will become apparent from a reading of the following specification and claims, together with the accompanying drawing in which like parts are referred to and indicated by like reference characters and wherein;

Conducive to a better understanding of this invention, it may be well to point out that conventional vises for use with machine tools are expensive, bulky and limited in their capacity. A conventional vise that will hold a piece of work eight inches wide will weigh over 200 pounds and cost several hundred dollars. Such a vise requires several men or the use of a block and tackle to locate it on, or remove it from, the work table or bed of a machine tool.

A vise or clamp made in accordance with this invention can be easily lifted and adjusted by one man and has a capacity that is limited only by the length of the work table of the machine with which it is used. Such a vise is shown in the Figure 1 as it appears when mounted on the work table 11 of a milling machine 10. The vise jaws 20 are placed on either side of the work 15 which is rigidly clamped between them along its bottom half, leaving the top of the work clear for any desired milling operation.

Figure 2:
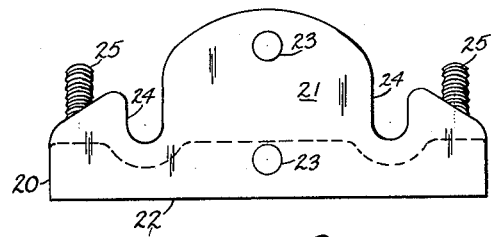
Figure 2 is a bottom view of one of the jaw members.

The jaw member 20 is made of any suitable material and in the preferred form is made of cast iron shaped as shown in the drawing. The bottom 21 is machined to a flat true surface and the face 22 is made to meet the bottom 21 at a 90° angle. Two socket pins 23 are positioned along the center line of the jaw 20 and extend beyond the lower surface of the base 21 as shown in the Figures 2, 4 and 6. Anchor slots 24 are spaced to fit over two of the T-slots of the particular work table with which the vise is to be used.

Reference character 30 indicates a separate work engaging jaw face which is fitted with two cylindrical plungers 31 which slide in correspondingly spaced apertures 27 in the jaw member 20.

Three screw jacks 25 are seated in threaded holes 26 which are inclined at an angle of approximately 25° to the surface of the work table on which the vise is used.

Figure 5:
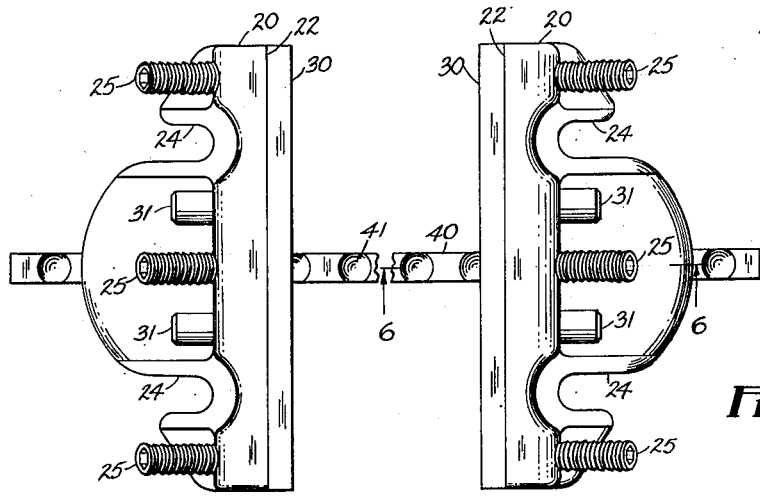
Figure 5 is a plan view of the two jaw members and the tie bar as they appear in their assembled condition.
Figure 6:
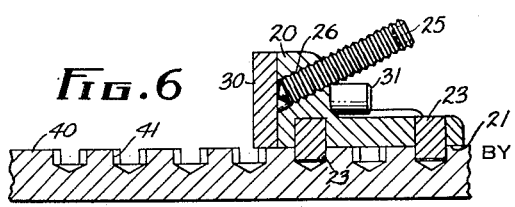
Figure 6 is a section thru one of the jaw members and tie bar, taken along the line and in the direction of the arrows 6—6 of the Figure 5.

The tie bar 40 has a plurality of sockets 41 drilled in its upper surface as shown in the Figures 5 and 6. The distance between sockets is approximately equal to the diameter of the sockets so that there will be ample wall thickness between sockets to bear any strain that may be brought to bear. The width and depth of the tie bar should be such that it will lie snugly in the work table T-slot with its upper surface slightly below the surface of the work table with which it is to be used. The length of the tie bar 40 is determined by the width of the work that is to be held and is limited only by the length of the work table of the machine tool.

Figure 1:
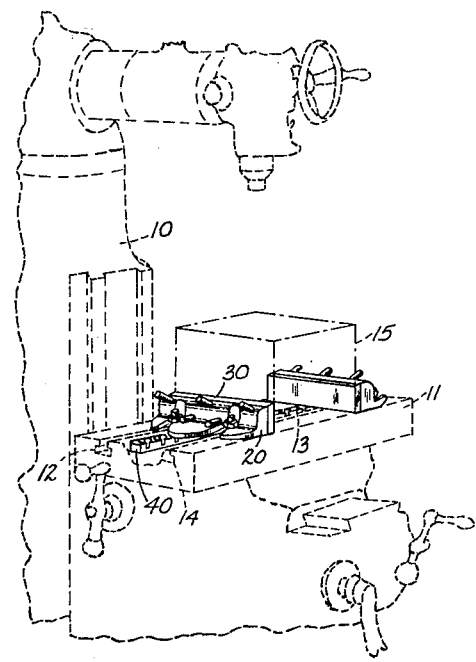
Figure 1 is a perspective view of a portion of a conventional milling machine, showing a piece of work being held on its work table by a vise made in accordance with this invention.
Figure 4:
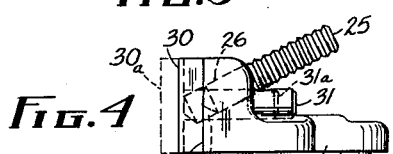
Figure 4 is a right end view of one of the jaw members with the jaw face also shown in an alternate expanded condition.

In using my vise, the tie bar 40 is dropped into the middle T-slot 13 of the work table 11 as shown in the Figure 1. The work 15 is then placed on the table in the desired position. The jaws are placed on the work table as close as possible to the opposite sides of the work with their socket pins 23 engaged with the sockets 41 of the tie bar 40. Figures 5 and 6 show how the jaws will then be astride the tie bar with their pins and and sockets engaged. Conventional T-bolts are then slid into the T-slots 12 and 14 and brought into engagement with the anchor slots 24 of the jaws 20. The bolts are then tightened securely, which anchors the jaws 20 rigidly in position on the work table 11. The jack screws 25 are then turned against the back of the work engaging jaw faces 30, thus urging the jaw faces 30 into tight contact with the work 15. Reference character 40a of the Figure 4 shows the jaw face 40 in this alternate position. The downward direction of the force applied to the jaw face due to the angular setting of the jack screws counteracts any tendency of the jaw face to spring upward or lift the work from contact with the table as the jaws are tightened.

Any movement of the individual jaw members along the work table under the impact of the milling operation is prevented by the tie bar 40. The two jaws are connected together thru their socket pins 23 and the tie bar 40 to form a single rigid unit that cannot creep, buckle or flex. Therefore work held in this vise will remain immovably and squarely in place on the work table.

Figure 3:
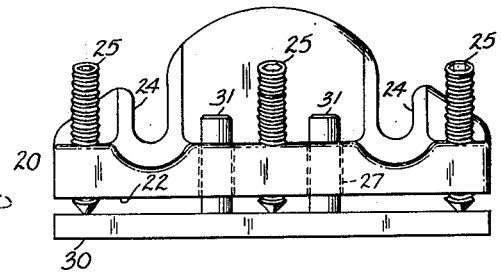
Figure 3 is a top view of one of the jaw members, with the movable jaw face attached.

If it is desired to hold rough and irregular objects by means of this vise, the smooth jaw face 30 may be removed from the jaw member 20 and the jack screws 25 alone used to engage the work. The screws 25 have hardened pointed tips as shown in the Figures 3, 4 and 6, which will dig into the work and hold it in place. The angular position of the screws will cause them to force the work down against the work table while the tie bar 40 will prevent longitudinal movement of the jaw members no matter how great the force brought to bear by the screws 25 against the work 15.

If it is desired to use this vise on a machine tool that has an unslotted work table or bed, a separate base having three longitudinal T-slots may be used. This base is secured to the bed of the machine by means of the conventional clamps, and the vise can then be applied to this auxiliary base in the manner heretofore described.

It will now be clear that there has been provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. A work holding clamp for mounting on machines having work tables provided with T slots, comprising in combination, a pair of facing jaw members adapted to receive a work-piece therebetween mountable on the said work table astride one of the aforesaid T slots, each of the said jaw members having screw means extending through the face thereof adapted to engage the said work piece and a dependent pin on the underside thereof; and a tie bar seated in the said worktable slot beneath the said spaced jaw members and having holes therein adapted to receive the said dependent jaw pins to lock the two jaw members against movement relative to one the other.

2. A work holding clamp for mounting on machines having work tables provided with T slots, comprising in combination, a pair of facing jaw members adapted to receive a work-piece therebetween mountable on the said work table astride one of the aforesaid T slots, each of the said jaw members having a plurality of work engaging bolts threadedly mounted therein and projecting downwardly through the face thereof at an acute angle thereto, and a dependent pin on the underside thereof; and a tie bar seated in the said work table slot beneath the said spaced jaw members and having holes therein adapted to receive the said dependent jaw pins to lock the two jaw members against movement relative to one the other.

3. A work holding clamp for mounting on machines having work tables provided with T slots, comprising in combination, a pair of facing jaw members adapted to receive a work-piece therebetween mountable on the said work table astride one of the aforesaid T slots, each of the said jaw members having a work engaging jaw face slidably mounted thereon including screw means mounted in the jaw member adapted to urge said jaw face into engagement with the aforesaid work piece, and a dependent pin on the underside thereof; and a tie bar seated in the said work table slot beneath the said spaced jaw members and having holes therein adapted to receive the said dependent jaw pins to lock the two jaw members against movement relative to one the other.

4. A work holding clamp for mounting on machines having work tables provided with T slots, comprising in combination, a pair of facing jaw members adapted to receive a work-piece therebetween mountable on the said work table astride one of the aforesaid T slots, each of said jaw members having a base portion and a vertically extending face portion perpendicular to the said base portion, the base portion having a dependent pin on the underside thereof, the face portion having a plurality of work engaging bolts projecting downwardly therethrough at an acute angle thereon; and a tie bar seated in the said work table slot beneath the said spaced jaw members and having holes therein adapted to receive the said dependent jaw pins to lock the two jaw members against movement relative to one the other.

LEE J. SEESE.

REFERENCES CITED

The following references are of record in the file of this patent:

UNITED STATES PATENTS

| Number | Name | Date |
|---|---|---|
| 381,890 | Taylor | Apr. 24, 1888 |
| 629,783 | Fanning | Aug. 1, 1899 |
| 1,071,215 | Deckard | Aug. 26, 1913 |
| 1,242,182 | Hallas | Oct. 9, 1917 |
| 1,674,291 | Malone | June 19, 1928 |
| 1,954,708 | Mass | Apr. 10, 1934 |
| 2,363,383 | Bertoldo et al. | Nov. 21, 1944 |